United States Patent
Roth

[15] 3,678,196
[45] July 18, 1972

[54] MEANS FOR PROJECTING AN ENLARGED TELEVISION IMAGE

[72] Inventor: Solo S. Roth, 1 Sherwood Terrace, Yonkers, N.Y. 10704

[22] Filed: Oct. 20, 1970

[21] Appl. No.: 82,388

[52] U.S. Cl. .................................................178/7.5 D
[51] Int. Cl. .................................................H04n 3/16
[58] Field of Search ............178/7.5 D, 5.4 R, 5.4 BD, 7.7, 178/7.8 L; 313/91, 89

[56] References Cited

UNITED STATES PATENTS

| | | | |
|---|---|---|---|
| 2,025,143 | 12/1935 | Zworykin | 178/7.7 |
| 2,500,929 | 3/1950 | Chilowsky | 178/7.5 D |
| 2,238,137 | 4/1941 | Strubig | 178/7.5 D |

Primary Examiner—Robert L. Griffin
Assistant Examiner—Richard P. Lange
Attorney—Ralph E. Bitner

[57] ABSTRACT

A projection means which includes the usual television receiving tube and its circuitry together with a plurality of bendable flaps secured to the outside surface of the tube. Conducting pins in the tube face transmit the electric charge received from the cathode ray to the flaps which then bend away from the pin ends due to the electrostatic repulsion. A source of light is directed towards the flaps which have a reflective coating on their outer surface. When the flaps are not moved, all the reflected light is cut off by a series of metal masks, but when a flap is moved, the reflected light is directed to the space between masks and may be focussed on a projection screen to create a picture.

8 Claims, 3 Drawing Figures

Patented July 18, 1972

3,678,196

SOLO S. ROTH
INVENTOR

BY *Ralph E. Bitner.*

ATTORNEY

MEANS FOR PROJECTING AN ENLARGED TELEVISION IMAGE

BACKGROUND OF THE INVENTION

Many attempts have been made to transfer the picture on a television receiving tube to a much larger image on a screen for viewing by a large audience. These attempts have never produced a commercial arrangement, mainly because the devices required a number of precise adjustments which were subject to alteration by changes of temperature, base alignment, and mechanical vibration. The present invention includes a plate made of transparent plastic with movable reflecting elements secured to one side and a plurality of strip masks secured to the other side. There is no chance of relative movement between the reflective units and the masking strips because they are both secured to the same plate. With this arrangement the only adjustments necessary are (1) the angular setting of the illuminating beam and (2) the focus of the projection lens.

One of the features of the invention is the integral arrangement of the sensitive reflecting elements. All the reflective flaps are part of a single sheet of plastic such as nylon. All the mask strips are secured to a plate base and the stationary portion of the flaps are clamped between the base and the outside surface of the television tube.

Another feature of the invention is the stability of the device. There are no moving parts except the hinged flaps and they move through an angle which is equal to or less than 6°.

For a better understanding of the present invention, together with other details and features thereof, reference is made to the following description taken in connection with the accompanying drawings.

DESCRIPTION OF THE PREFERRED EMBODIMENT

Figure 1:
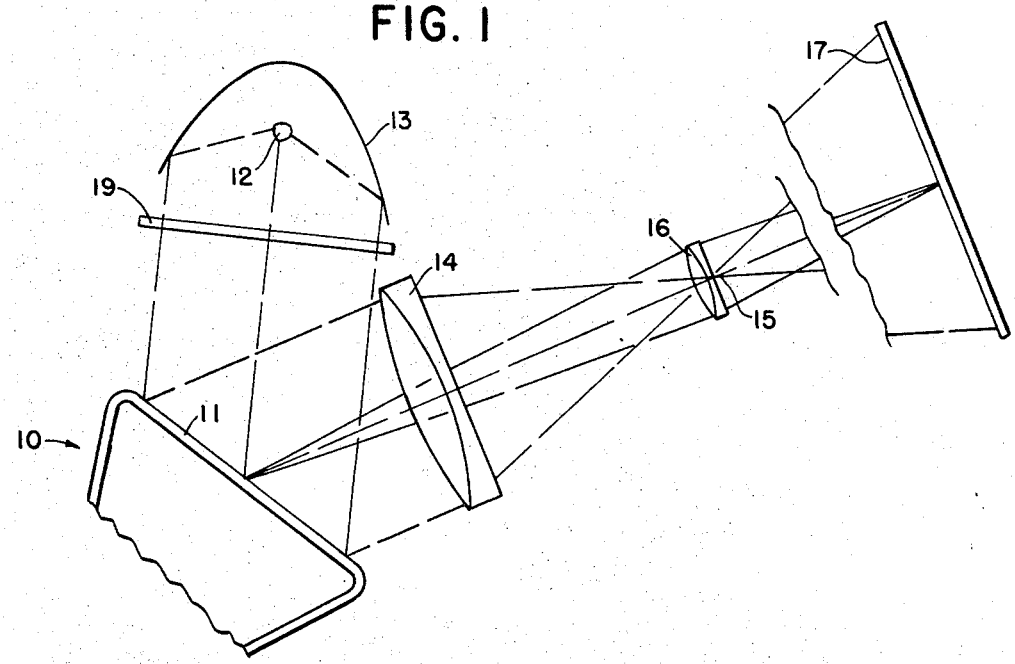
FIG. 1 is a diagramatic layout of all the parts of the optical system.

Referring now to FIG. 1, a television tube 10 is shown in part with a flat surface 11 on which is positioned the array of reflective elements. A source of light 12, which may be an arc lamp or a gasseous high intensity lamp, is mounted at the focal point of a parabolic mirror 13 so that parallel light rays are directed toward the face 11 of the picture tube. The reflected rays are collected by a large field lens 14 and directed to a focus 15 where a projection lens 16 focuses the rays from the surface 11 onto a viewing screen 17. A heat absorbing filter 19 may be used.

Figure 2:
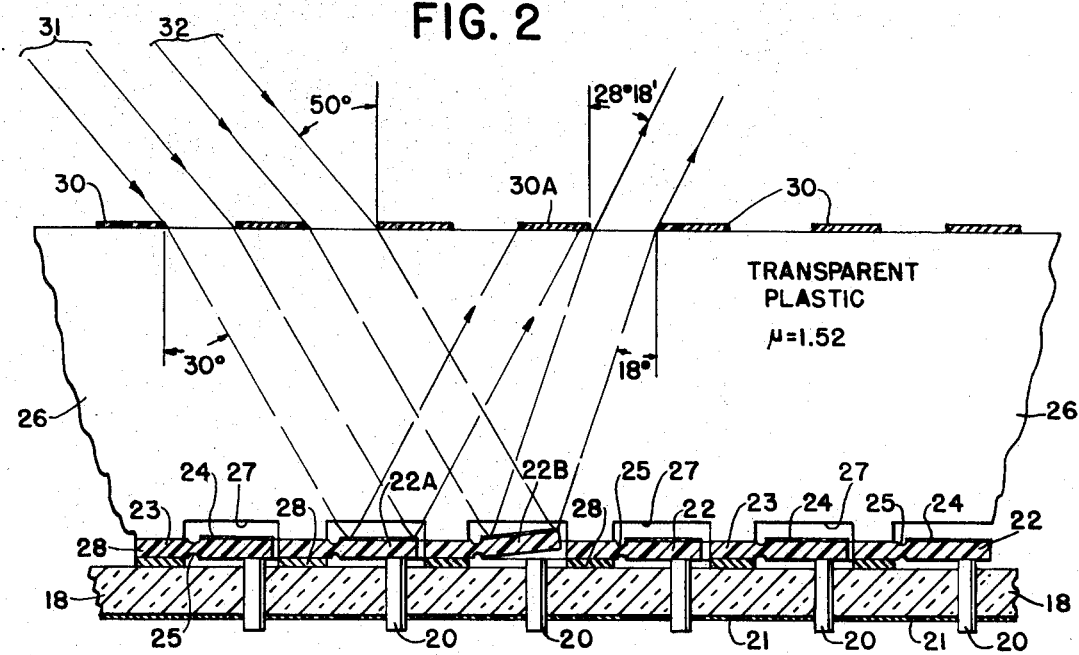
FIG. 2 is a detailed cross sectional view of the hinged reflective elements, the masks, and the conductive pins in the face of the television tube.
Figure 3:
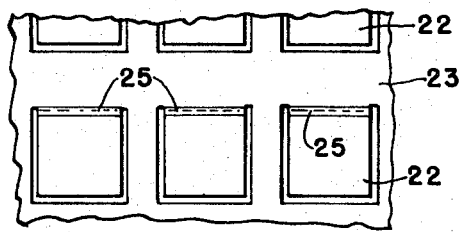
FIG. 3 is a plan view of a portion of the reflective sheet with the hinged elements formed therein but before the reflective material has been added.

Referring now to FIGS. 2 and 3, the end 18 of the cathode ray tube 10 contains a plurality of conductive pins 20 welded in the glass and equally spaced over the picture area. Each pin represents one elemental area in the final picture array. On the inside area a resistive coating 21 is deposited for slowly discharging the pins after they have been charged by the cathode ray.

On the outside surface of the tube 10 an array of bendable flaps 22 are positioned. The flaps are punched or preformed from a single sheet 23 of plastic which is given a thin coating of a reflective metal, such as silver, on its upper side. The flaps are preferably formed with one or two groves 25 to facilitate bending. On top of the nylon sheet 23 is a plastic base plate 26, formed of transparent material such as methylmethacrylate and having pockets 27 which permit the flaps 22 to move upwardly for their maximum movement of six degrees without hitting the plastic base. If the pins 20 extend a uniform distance above the glass plate 18, another sheet 28 can be used to elevate the flaps. This is the preferred arrangement since it provides a small air space under the flaps and helps reduce the resistance to starting the flap movement from its zero or initial position.

On top of the plastic plate 26 a series of mask strips 30 are placed. These strips may be formed by plating the entire area with a metal or other opaque substance and then etching or otherwise removing strips of the material to leave the masks 30. FIG. 2 shows a first beam of light 31 entering the plate 26 at an angle of 50°. After refraction by the plate ($u$=1.52) the beam proceeds to a flap 22A in its zero or unmoved position. The beam is reflected upwardly to the underside of a mask 30A where it is stopped. No light is passed to the screen which appears dark at this projected area. A second beam of light 32 enters at the same angle, strikes a flap 22B which has been moved its full six degrees from its zero position. The resulting reflected beam, making an angle of 18 degrees with the normal, strikes the area between masks and all of the beam is sent to the viewing screen 17 after being focused by the lens system 14, 16. It is obvious that smaller angular movements of the flaps will present proportional amounts of light to the space between masks and therefore produce all the gradations between white and black.

When the system is operated, the cathode ray picture tube is controlled by the usual well known power controls to cause a focused cathode ray to sweep over the array of pins, line after line, in sequence. Each time the ray strikes a pin 20 the ray applies a negative voltage to the pin and the flap 22 is repelled an amount responsive to the ray's voltage at that time. When the ray passes to the other pins, the charge slowly leaks off to ground by way of the resistive coating 21 on the inside surface of the tube. Each pin receives a fresh charge (or none at all) 30 times a second so the resistive coating is arranged to discharge the pins fully by one thirtieth of a second. As the pins lose their charge, the flaps 22 return to their zero position.

The above description is specific to the production of a black and white picture. Conversion to a three color picture can be made by aligning the pins 20 and their flaps to the red, green, and blue areas scanned by the cathode ray in a color picture tube. If the pin 20 under flap 22B receives a charge responsive to the red content of a picture then the area above the flap, on the upper surface of plate 26 must be colored red to act as a filtering means. Other areas are coated with red, green, and blue to make up the entire colored picture. Other arrangements for color production are possible. For example, colored filler inserts may be placed in the top portion of each of the cavities 27 to filter the light beams. In this case the light beams pass through the filters twice, just before reflection and just after being reflected.

While Nylon is the preferred flap material, because it can be molded in a single piece, other materials can be used. A thin sheet of an alloy of copper and beryllium may be used for the flaps because of its resiliency. It is then coated on the upper side with silver to reflect the light and on the lower side with a dielectric for retaining the electric charge.

Having thus fully described the invention, what is claimed as new and desired to be secured by Letters Patent of the United States is:

1. A projection system for showing an enlarged image of a television tube picture on a viewing screen comprising:
   a. a plurality of spaced conductive pins welded in the face of a television cathode ray receiving tube, said pins for sequential activation by a cathode ray electron beam to apply negative charges thereto;
   b. means for causing a focused cathode ray electron beam to sweep over the ray of pins;
   c. a plurality of bendable flaps, one for each pin, positioned on the outside surface of the receiving tube in a plane parallel to said surface, each of said flaps containing an upper reflecting surface;
   d. a transparent plastic plate mounted above the flaps and including a cavity above each flap to permit flap movement therein, said plate also including a plurality of opaque mask strips for masking light reflected from the flaps when the flaps are in the flap plane and for passing light from the flaps when they are moved out of the plane by negative charges on the pins;

e. a source of illumination for supplying light to the flaps;

f. and an optical system for receiving the light reflected from the flaps and for focusing the light onto a viewing screen.

2. A projection system as claimed in claim 1 wherein a resistive layer is positioned on the inside surface of the cathode ray tube for discharging the pins after being charged by the cathode ray.

3. A projection system as claimed in claim 1 wherein portions of the plastic plate adjoining the cavities clamp stationary portions of the flap sheet to the outside face of the television tube.

4. A projection system as claimed in claim 1 wherein the upper reflecting surface of the flaps is a layer of silver.

5. A projection system as claimed in claim 1 wherein each flap is part of a unitary sheet of plastic material and wherein each flap is secured to the sheet by a portion of the sheet having a reduced section to cause bending at that area.

6. A projection system as claimed in claim 1 wherein the source of illumination is an arc lamp and wherein light from the lamp is reflected by a paraboloid mirror to apply substantially parallel light rays to the plastic plate.

7. A projection system as claimed in claim 1 wherein the flaps and the unitary sheet material are nylon.

8. A projection system as claimed in claim 1 wherein the flaps are joined to the unitary sheet by sheet material having upper and lower groves formed opposite to each other to facilitate bending.

* * * * *